United States Patent [19]

Forkner

[11] 4,042,720
[45] Aug. 16, 1977

[54] CACTUS TREATMENT PROCESS AND PRODUCT

[76] Inventor: John H. Forkner, 2116 Mayfair Drive West, Fresno, Calif. 93703

[21] Appl. No.: 704,537

[22] Filed: July 12, 1976

[51] Int. Cl.² .......................... A23L 1/06; A23L 1/212
[52] U.S. Cl. .................................... 426/573; 426/615; 426/639
[58] Field of Search ............... 426/615, 639, 640, 658, 426/573, 577, 654, 478, 479

[56] References Cited

U.S. PATENT DOCUMENTS

| 3,057,736 | 10/1962 | Forkner | 426/639 |
| 3,057,737 | 10/1962 | Forkner | 426/640 |
| 3,057,738 | 10/1962 | Forkner | 426/640 |

Primary Examiner—Jeanette M. Hunter
Attorney, Agent, or Firm—Flehr, Hohbach, Test, Albritton & Herbert

[57] ABSTRACT

Removing interdispersed grain from cactus fiber, grinding the grain for separate use or for blending with the grain free fiber. Ground grain and fiber may be combined with sugar syrup to produce a jam.

15 Claims, 2 Drawing Figures

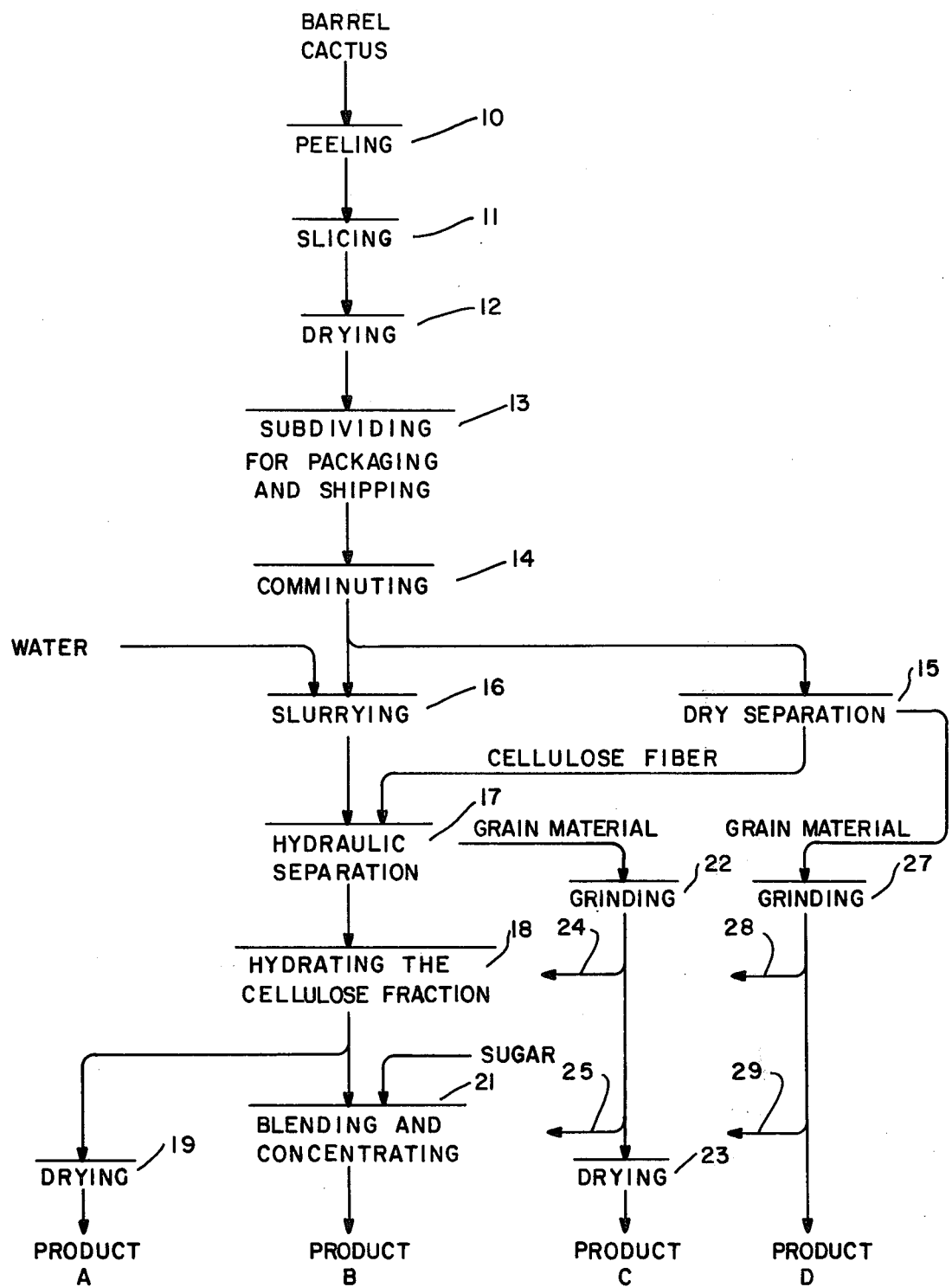
FIG.—1

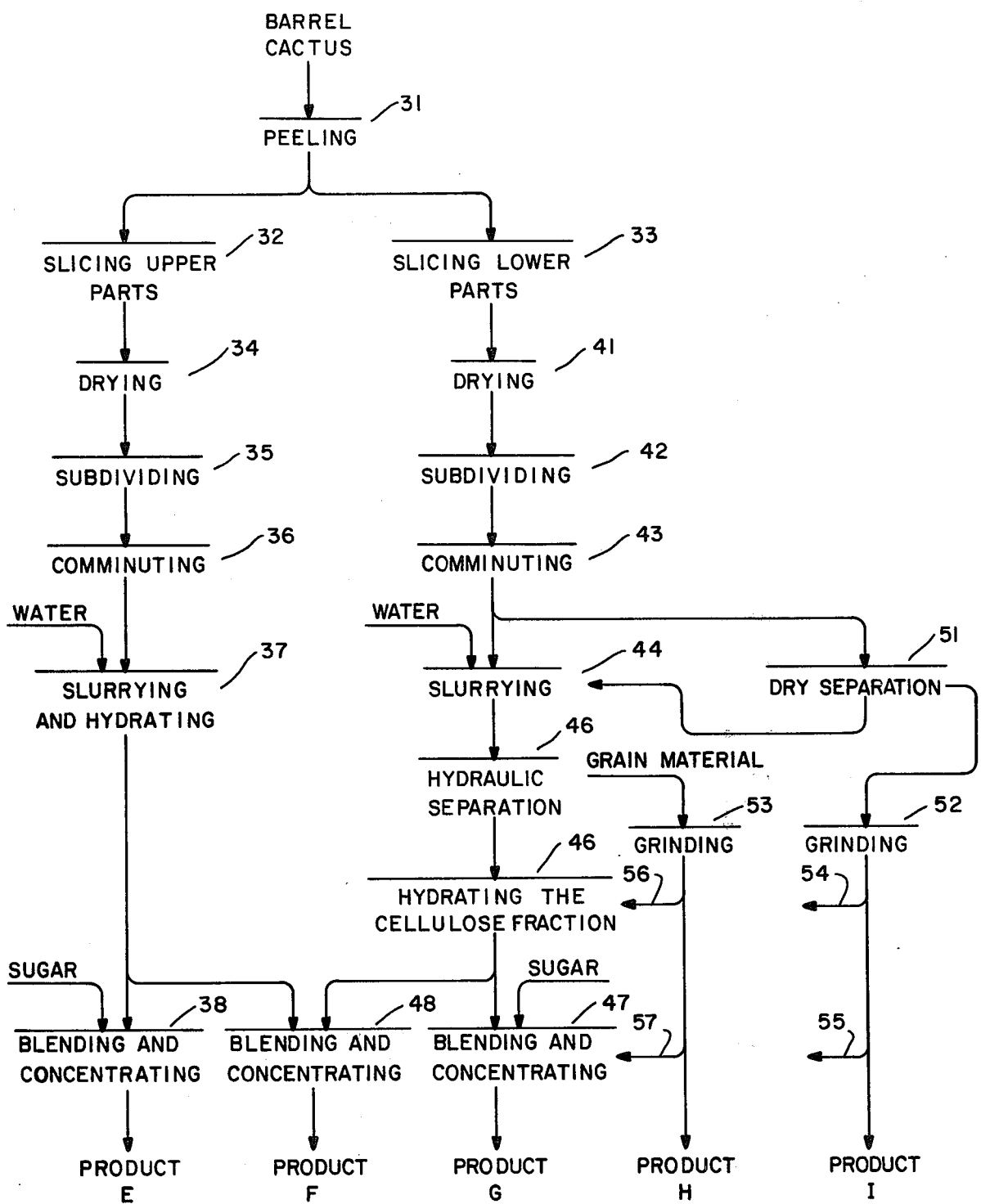
FIG.—2

CACTUS TREATMENT PROCESS AND PRODUCT

BACKGROUND OF THE INVENTION

This invention relates generally to processes making use of cactus pulp to produce products for the food industry.

As disclosed in U.S. Pat. Nos. 3,057,736, 3,057,737, and 3,057,738, all dated Oct. 9, 1962, the pulp of barrel cactus has certain desirable characteristics when processed in a particular manner. The processing disclosed in said patents involves peeling the cactus after it has been field harvested, cutting the pulp into slices of a thickness of the order of 1/16 to ⅜ inch, and then drying the slices to a moisture content of 5% or less. Drying is preferably carried out in the field where the cactuses are harvested, preferably by exposing the slices to sunlight. To facilitate transportation to a processing plant after sun drying, it is desirable to break up the slices into fragments which for example may be less than one inch in their major dimensions. At the final processing plant the material is subjected to further processing as disclosed for example in U.S. Pat. No. 3,057,736 to produce edible products such as jams or jam-like products. The cellulosic cactus fiber is hydrophilic and absorbent, and functions as a stabilizer in jams or other hydrous food products.

It has been found that a substantial amount of the available barrel cactus found in Mexico contains relatively hard grains dispersed in the pulp, and which imparts an unpleasant gritty character to edible products made from such pulp. For example, particular reference can be made to barrel cactus grown north of Mexico City in the San Luis Potosi region. The soil of this region is alkaline, which may account for the presence of grains. An analysis of the grain material shows that it contains a high percentage of calcium, probably in the form of calcium sulfate. The amount of recoverable grain material may be of the order of 15 to 50% (by weight) of the total pulp. The particle size of the grains may vary, but in a typical instance they may be of such size that they pass through a 20 mesh screen with about one third remaining on a 48 mesh screen. It has been noted that the concentration of the grain material is frequently in the lower portion of the cactus plant. Thus slices taken from the upper portion of a plant may be relatively free of grain material, while slices taken from the lower portion of the plant contain a relatively high concentration of grains. According to my observations, the substance of the grains is not dietetically detrimental, and may be beneficial.

SUMMARY OF THE INVENTION AND OBJECTS

In general it is an object of the present invention to provide a process for the treatment of cactus pulp which makes possible the economical removal of grain material from the cellulosic pulp fiber.

Another object is to provide a process which makes possible the economic utilization of such grain material.

Another object is to provide a process which produces cellulosic end products for the food industry that are acceptable with respect to grittiness. Another object is to make useful application of the grain material in products such as sugar based pastes (e.g., pastes made from strawberries or pears), with grain material serving to simulate or supplement natural berry or fruit grain.

In general, according to the present invention, barrel cactus is field harvested and after slicing it is dried to a moisture content of about 2 to 5%. This dried material is then transported to a processing plant, preferably after it has been broken into fragments to facilitate bagging or packaging. The processing of this dried material consists of comminuting it to a particle fineness sufficient to free the heavier grains from the cellulosic fiber. Thereafter the grains are separated from the fiber while the material is in dry, divided form, or by first mixing the material with water to form a slurry and then separating the grains from the slurry. The separated grains are preferably ground, and the ground material recombined with the cellulosic fiber. The process may also involve incorporating an additive like sugar or a sugar based material like jam with the cellulosic fiber after the fiber has been hydrated.

Additional objects and features of the invention will appear from the following description in which the preferred embodiments have been set forth in detail in conjunction with the accompanying drawing.

BRIEF DESCRIPTION OF THE DRAWING

FIG. 1 is a flow diagram illustrating one procedure for carrying out the process.

FIG. 2 is a flow diagram illustrating another procedure for carrying out the process.

DESCRIPTION OF THE PREFERRED EMBODIMENTS

The process as illustrated in FIG. 1 consists of subjecting the barrel cactus to peeling in step 10, after the cactus has been field harvested, and then subjecting the peeled pulp to slicing 11. The slices may have a thickness of the order of 1/16 to ⅜ inch, and may then be left in the field for sun drying. Other conventional drying method can be employed, such as hot air or vacuum drying, although sun drying is economical and has some advantages. When the slices have a moisture content of 5% or less, they are collected, and at that time they may be subdivided into fragments to facilitate bagging or other packaging for transportation to a processing plant. The fragments may for example have a major dimension of less than 1 inch.

Further processing of the dried cactus involves comminuting or grinding the friable material in step 14 to a particle size such that all or a major part will pass through a 12 mesh screen, and preferably through a 20 mesh screen. This can be carried out by use of a suitable mill of the hammer type, either at an intermediate plant to which the dried fragments are transported, or at a final processing plant. Following comminuting in step 14, the material is subjected to a grain separating operation. It has been found that when the material is comminuted as in step 14, most of the grain material can be readily separated from the cellulosic fiber and is relatively heavier than the fiber particles. Grinding in step 14 not only serves to reduce the size of the cactus particles, but in addition it breaks down the structure of the grains and releases cellulosic fiber from physical attachment to the grain material, with reduction in particle size of the mineral content without materially reducing the size of the released fiber. This serves to substantially increase the effectiveness of the subsequent separation of the larger particles of fiber from the smaller and heavier particles of grain material. They can be readily separated from the fiber either in dry condition or in wet form by hydraulic separating methods, or by both methods carried out in successive stages. Step 15 represents subjecting the material from step 14 to dry separation whereby as indicated the grain material is separated from the cellulosic fiber material. Such dry separation may utilize pneumatic separators such as cyclones and the like, or by known mehods involving shaking or vibrating the material in a container to cause the heavier grain material to settle out by gravity. Step 16 indicates combining the dry comminuted material with water to form a slurry and then, in step 17, the slurry is subjected to hydraulic separation for removal of the grain material. Hydraulic separation can be carried out in any one of several ways, such as by the use of cone settlers, centrifuges, or hydrocyclones. Being heavier, the ground grain material is separated and removed in an underflow and the lighter fiber particles are removed in the overflow.

As indicated in FIG. 1, the cellulosic fiber from the dry separating step 15 may be merged with material from step 16, and the combined material subjected to further hydraulic separation. When this routing is followed, the comminuted pulp is subjected to both dry and wet separating methods.

The slurry in steps 16 and 17 is at ambient temperature, and during the time required for these steps there is only limited hydration of the cellulosic fiber. It has been noted that the difference between the separating characteristics of the material due to wetting in steps 16 and 17 accentuates the weight of the ground grain material disproportionately to the increase in weight of the cellulosic fiber. In general, both the steps 16 and 17 can be carried out within a reasonable period of time during which the cellulosic fiber is not hydrated to such an extent as to materially alter its settling characteristics, as for example, a period of the order of 15 seconds to 20 minutes.

Following the removal of grains by hydraulic separation in step 17, the cellulosic fiber is substantially completely hydrated in step 18. This is carried out by heating the slurry to an elevated temperature of the order of from 200° to 212° F. and holding it for a period of 1 to 60 minutes. The material from step 18 is shown being subjected to drying 19 to produce the dry divided product A. This product is desirable as a hydrophilic and absorbent material useful in various products as a stabilizer. For example, it can be introduced into such products as jams or jam-like materials (e.g., jams containing sugar and berries or fruits) to lend body, stability and viscosity.

Some of the product from step 18 is shown being subjected to concentration by evaporation in step 21 after an additive like sugar or sugar-syrup has been added. The resulting product B is a paste concentrate suitable for formulating a wide variety of edible products, including jams and jam-like materials that are particularly suitable for use as a component of bakery products.

The ground grain material derived from the cactus pulp may be further processed to place it in such form that it can be added back to the cellulosic fiber without creating objectionable grittiness. Thus the grains from the hydraulic separating step 17 are shown being subjected to further grinding 22, as by use of a hammer mill, to reduce this material to the form of a powder. The particle size may for example be such that all of the powder will pass through a 48 mesh screen. The resulting slurry can be subjected to drying 23 to produce the dry powdered product C. Also as indicated, all or a portion 24 may be combined with the hydrated cellulosic fiber in step 18, or all or a portion 25 can be added in the blending step 21. Grinding to a fine powder in step 22 is a simple matter when applied to the separated grain material. If one should apply fine grinding simultaneously to both fiber and grain, the fiber would be reduced in particle size, with the result that certain undesirable properties would be created for most of the fiber particles. For example, when mixed with water the mass or slurry would be pasty or slimy and its ability to thicken aqueous mixes or syrups would be reduced.

Assuming dry separation for removal of some of the grain material, these grains can likewise be subjected to grinding 27 to produce a dry powder to produce the product D. Also all or a portion 28 can be added in the hydrating step 18, and a portion 29 can be added to the blending step 21.

It has been found that some grain material can be utilized in products like sugar-based pastes used in the manufacture of fruit flavored jams, to simulate the natural grain of such berries and fruits as strawberries and pears. Thus some separated grain material from step 17 can be blended with fiber and sugar in step 21. The grain so imparted may supplement or take the place of natural grain. In particular, such grain can be used to produce a strawberry paste suitable for the manufacture of strawberry jam.

As previously mentioned, the upper portion of the pulp of some barrel cactus may be relatively free from grain. This property is used to advantage in the procedure of FIG. 2. Here the pulp after peeling in step 31 is sliced, with the slices 32 from the upper part being kept separate from the slices 33 from the lower part. Assuming that the slices taken from the upper part are substantially free of grain, they are then subjected to drying 34 as previously described, after which they are subdivided in step 35 for packaging and shipping. The processing of this material involves comminuting in step 35, after which the material is mixed with water for form a slurry, and the slurry heated to a temperature of the order of 200° to 212° F. to complete hydration of the cellulosic fiber. In step 37 the slurry is blended with a material like sugar or sugar syrup, and then subjected to concentration by evaporation to produce the product E.

The slices 33 representing the lower part of the cactus pulp are shown being subjected to drying 41, after which they are broken into fragments in step 42 for ease of packaging and shipment. In the next processing operation these fragments are comminuted in step 43, and for wet separation of grains the comminuted material is mixed with water to form a slurry in step 44, and the slurry subjected to hydraulic separation 45. Thereafter the cellulosic fiber is hydrated in step 46 by raising the temperature to 200° to 212° F. for a period of the order of from 15 seconds to 60 minutes, and the fiber subjected to blending and concentration in step 47 to produce the product G. A product F is shown being made by blending together cellulosic fiber taken from steps 37 and 46, as indicated by step 48.

Step 51 indicates possible dry separation being applied to the comminuted material from step 43 to remove grain material from dry cellulosic fiber material. The cellulosic fiber material is shown being supplied to the slurrying step 44, and the grains from step 51 are shown being subjected to further grinding 52 to produce the dry powdered product I. Grain material from the hydraulic separating step 45 is shown being subjected to further grinding 53 to produce the product H. All or some of the dried ground grain material from step 52 is shown being diverted for introduction into either step 46 or 47 by way of lines 54 and 55. Lines 56 and 57 represent similar return of wet ground grain material to the process.

It will be evident that with the process shown in FIG. 2 the amount of material requiring processing for removal of grains is greatly reduced, since a substantial amount (e.g., 25 to 50% by volume) of the original pulp need not be subjected to separating operations, since it is either free of grains or the grains are present in an acceptable amount.

The process of FIG. 2 can also be carried out to provide visible pieces of cactus pulp of substantial size, which may be desired to make certain end products characterized by such pieces. Thus instead of comminuting in step 36, all or some of the material after drying can be subdivided into pieces of substantial size which can be hydrated by boiling in water and thereafter processed, as by incorporation in sugar syrup or jam to provide chunks or pieces of distinct flavoring and/or color. The hydrated pieces formed in this manner may for example have a thickness corresponding to the thickness of the dried cactus slices (e.g., $\frac{3}{8}$ inch) and may be blended with material from step 46.

Reference has been made to use of the cellulosic fiber as a stabilizer in various food products and formulations. In addition to being hydrophilic, it has the ability to absorb sugar syrup. Thus when the fiber is used in formulations having a substantial amount of sugar syrup, during concentration by evaporation the fiber absorbs syrup simultaneously with concentration in a single cooking cycle (e.g., from 50 to 80 Brix in less than 1 hour). The resulting product is stabilized by the cactus cellulosic fiber, in that body is imparted which is retained for prolonged periods. When such impregnated fiber is used as a filling for bakery products, the physical form is retained during exposure to baking temperatures, and migration of moisture from the stabilized form to the adjacent cooked dough or batter is minimized, whereby moist eating properties are retained over extended periods of storage. Also when blended with a dough (e.g., 25% dry solids basis) it serves to reduce dough spread during baking and imparts moisture retention and chewey eating properties that likewise are retained over extended periods of storage.

Examples of the invention are as follows:

EXAMPLE 1

The cactus employed was a variety commonly known in Mexico as Biznaga, having a substantial amount of grain material, harvested in the San Luis Potosi Region, north of Mexico City on the Mexican Plateau, at an elevation of about 5000 feet. After harvesting, the cactus has been peeled, cut into slices about $\frac{1}{4}$ inch thick and sun dried. The dried slices had been broken into fragments for shipment initially to a field gathering station where they were further subdivided by hammer mill type attrition to facilitate compact packaging for shipment to a final processing plant. The moisture content was 2% and a screen analysis was as follows:

10% remained on a No. 20 screen
35% passed through a No. 20 screen but remained on a No. 48 screen
55% passed through the No. 48 screen The material was passed through a hammer mill to reduce the particle size to minus 20 mesh. The material was then mixed with water to form a slurry and hydraulic separation was carried out by permitting a batch of the slurry to settle in a container after agitation. The grain material rapidly settled to the bottom of the container and the upper slurry was removed by decantation. The grain material thus separated was about 44% by weight (dry basis) of the dried cactus material. The dry grain material was of such size that all passed through a No. 20 screen, and 80% passed through a No. 48 screen.

The fiber fraction was placed in a kettle and heated to boiling point (212° F.). Boiling was continued for about 5 minutes, after which the material was held at simmering temperature (about 200° F.) for about 15 minutes. This served to complete rehydration of the fiber. Equal parts of granulated sucrose, invert sugar syrup (80 Brix) and corn sugar syrup (83 Brix) were added and the water content of the mix adjusted to provide a concentration of 50 Brix. The weight of cactus fiber (dry basis) in the mix was of the order of 20% of the combined weight of the sugar, invert syrup and corn syrup. Concentration by evaporation produced a final paste concentrate of 80 Brix.

It was verified that the separated grain material can be readily ground by a hammer mill to a particle fineness to pass a No. 100 mesh screen, and that after such grinding the material can be blended with the fiber fraction without creating unacceptable or undesired grittiness, or added to other food materials as a natural calcium supplement.

In a separate instance the grain was initially removed at a field gathering station, and after grinding the mass to the screen sizes indicated, dry separation was applied with vibration to remove about two-thirds of the grain material present. Fiber so separated was processed by hydraulic separation to remove the residual free grain present.

EXAMPLE 2

The purpose of this example was to determine the separating effectiveness obtained by screening the dried material resulting from step 14 of FIG. 1. The sample of dried cactus employed was that produced in Example 1 before proceeding to effect separation between grain material and fiber. The sample was subjected to dry screening, making use of a minus 48 mesh screen. This produced two screen fractions of approximately equal weights. It was determined that with respect to the finer fraction, over 75% by weight was grain material. With respect to the coarser fraction, over 75% was fiber. Also it was determined that by applying such dry screening, over 75% of the total material subjected to screening was recovered in the coarser fraction. Both of the screen fractions were slurried with water and subjected to hydraulic separation. This served to effectively separate cellulosic fiber and grain material contained in each fraction. It was concluded from these tests that dry screening could be employed to carry out preliminary separation into fractions containing different percentages of fiber and grain, and that such fractions could thereafter be subjected to further separation, as by conventional hydraulic separating equipment, to carry out more complete separation.

EXAMPLE 3

Dried cactus fiber was prepared corresponding to product A of FIG. 1, making use of the procedure described in connection with this figure and in Example 1.

A conventional fig jam was prepared, using 100 pounds of Calimyrna figs, to which was added sugars amounting to 66% of the weight of the figs, the sugars comprising equal parts by weight of dry granulated sugar, corn syrup and invert syrup of 80 Brix. Four pounds of water was added and the material subjected to mixing to produce a relatively thick jam. The body or viscosity of the resulting jam was not sufficient as is ordinarily desired for the manufacture of fig bars because, if the jam was extruded to produce a filling ranging from ⅜ to ½ inch, it tended to spread and provide less jam surface exposure at the severed ends of the bars. Two percent of dry cactus cellulose corresponding to product A was added and homogeneously intermixed with the jam, and thereafter the stabilized jam was used in the manufacture of fig bars, with the jam being extruded to provide a filling ½ inch thick. These bars were subjected to conventional high temperature baking, after which they were severed and inspected. It was found that there had been substantially no spreading of the filling, and that the thick jam facing was exposed at the ends of the severed bars. This demonstrated the ability of the product A to impart good stability to jams, whereby the jam maintains body and viscosity during baking, with optimum resistance to severing mechanisms after baking and while hot. This is in contrast to other so-called stabilizers such as gelatin, pectin and the like, which tend to permit the jam to liquify when hot.

EXAMPLE 4

The procedure of FIG. 1 was carried out according to Example 1 to produce product B, which was cellulosic fiber blended with sugar syrup at 80 Brix. A commercial strawberry jam at 68 Brix was then blended with product B, and this mix was concentrated by evaporation to produce a final concentration of 80 Brix. In instances where the separation of grain material from the fiber was not complete, leaving a small amount of grain material with the fiber, it was found that this grain material provided a grittiness in the final product which simulated and enhanced the natural grittiness of strawberry jam. Also it was found that the degree of grittiness in the final product could be adjusted either by control of the separating operation to separate the grain material from the fiber, or by introducing controlled amounts of grain material from step 17 to the blending step 21.

EXAMPLE 5

A paste concentrate was prepared as described in Example 1, but using only the lower two-thirds of the cactus. The upper one-third of the cactus after slicing and drying was subdivided into pieces of varying size (e.g., ⅛ to ¼ inch). These pieces were then hydrated in boiling water, as in Example 1, and the moist pieces introduced into and impregnated with an orange colored and orange flavored sugar syrup prepared as in Example 1. After concentrating by evaporation to 80 Brix, the impregnated pieces were separated from free syrup in a basket type centrifuge. The resulting colored and flavored sugar impregnated pieces were then blended with the paste concentrate produced from the lower two-thirds of the cactus in the proportions of 25% impregnated pieces to 75% of the impregnated paste made from the lower two-thirds of the cactus. This provided a product comprising pieces of distinctive color and flavor dispersed in the paste containing cactus particles of relatively fine size.

What is claimed is:

1. A process for the treatment of dry cactus pulp containing cellulosic fiber and gritty hard grain material, comprising comminuting the dry pulp to free heavier grain material from cellulosic fiber, and then separating grain material from cellulosic fiber.

2. A process as in claim 1 in which the separation is carried out with the comminuted pulp in dry form.

3. A process as in claim 1 in which the comminuted dry pulp is mixed with water to form a slurry, and the separation carried out by separation of the grain material from the slurry.

4. A process as in claim 1 in which separated grain material is ground, and at least a part of such ground material mixed with the separated celluosic fiber.

5. A process as in claim 1 in which the separation is carried out by mixing the comminuted pulp with water to form a slurry, separating grain material from the slurry, grinding separated grain material to form a product of high mineral content, blending at least a part of the ground grain material with the cellulosic fiber and hydrating both the cellulosic fiber and the ground grain material by heating the slurry containing the same to a temperature of about 200° to 212° F.

6. A process as in claim 5 in which sugar is added to the slurry containing the hydrated cellulosic fiber and ground grain material, and the resulting hydrous mix subjected to concentration by evaporation.

7. A process as in claim 1 in which the separated cellulosic fiber is incorporated in a jam to stabilize the same.

8. A process as in claim 7 in which the jam is inherently gritty and in which separation of grain material from the cellulosic fiber is carried out in such a manner as to leave a part of the grain material with the fiber, such remaining grain material serving to enhance the inherent grittiness of the jam.

9. A process as in claim 1 in which the cactus pulp is derived from the lower portion of barrel cactus and separated cellulosic fiber obtained from the same is blended with another source of relatively grain-free cellulosic fiber derived from the upper portion of such cactus.

10. A process as in claim 9 in which the cellulosic fiber derived from the upper portion of the cactus is in the form of visible pieces of substantial size, the comminuted fiber derived from the lower portion of the cactus is impregnated with sugar based sugar syrup, the pieces derived from the upper portion of the cactus are separately impregnated with sugar based syrup, and the impregnated comminuted fiber and impregnated pieces are blended together.

11. A process as in claim 10 in which the pieces are impregnated with a syrup of distinctive color and flavor differing from the color and flavor of the impregnated material made from the lower portion of the cactus.

12. The product produced by the process of claim 5.
13. The product produced by the process of claim 6.
14. The jam product produced by the process of claim 7.
15. The product made by the process of claim 10.